May 7, 1940.  E. MEYER  2,200,035

FOOD CHOPPER

Filed Sept. 13, 1939  2 Sheets-Sheet 1

ELSIE MEYER
INVENTOR.

BY
ATTORNEY.

May 7, 1940.　　　　　E. MEYER　　　　　2,200,035
FOOD CHOPPER
Filed Sept. 13, 1939　　　　2 Sheets-Sheet 2
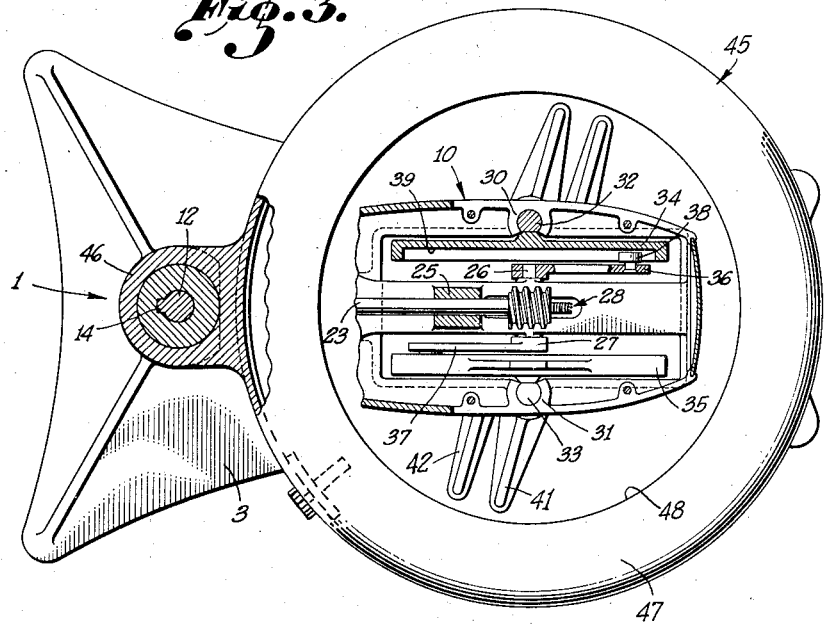
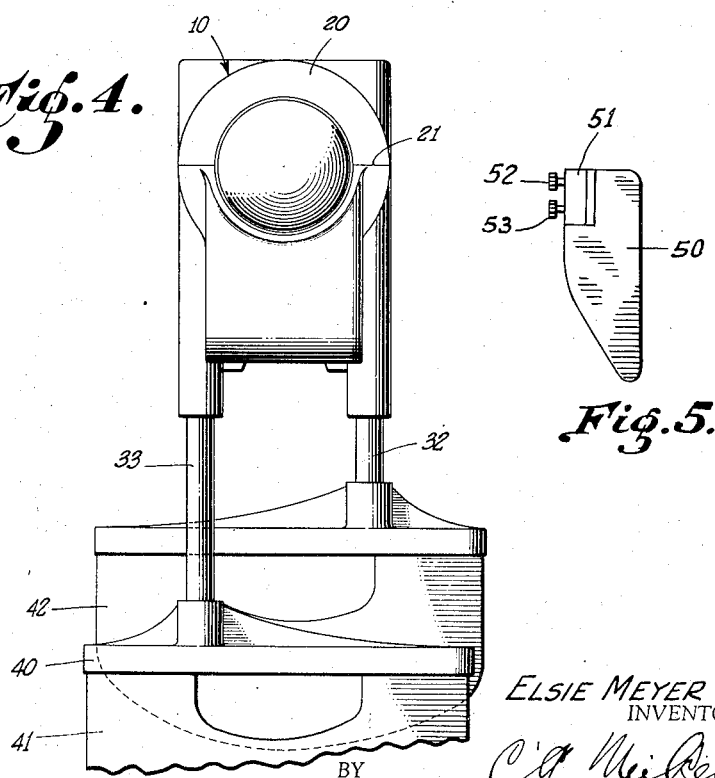
ELSIE MEYER
INVENTOR.
ATTORNEY.

Patented May 7, 1940

2,200,035

UNITED STATES PATENT OFFICE 2,200,035

FOOD CHOPPER

Elsie Meyer, Los Angeles, Calif.

Application September 13, 1939, Serial No. 294,601

4 Claims. (Cl. 146—69)

The present invention relates to a portable automatic food chopper particularly adapted for use by housewives and in kitchens, for chopping meats, fish, fowl, vegetables and other food stuffs. Ordinarily, the chopping of food is accomplished with a knife or with a bladed, manually operated implement. The present invention is directed to an automatic, motor driven device which is simple in construction and which has a number of advantages, as will be apparent from the description given hereinafter.

Generally stated, the device of this invention comprises a base provided with an upstanding boss. The base is provided with a forward extension adapted to receive and hold a suitable bowl or container into which the material to be chopped can be placed. The upstanding boss receives the lower end of an arm, the arm being provided with a housing containing a motor and suitable gearings and mechanism which translate the rotary motion of the motor shaft into a reciprocating action of a pair of substantially parallel, vertical and downwardly extending rods, these rods carrying knife blades at their lower ends. The rods are adapted to reciprocate within a bowl supported by the forward extension of the base. In its preferred form, the two rods reciprocate alternately, one of the rods moving downwardly while the other moves upwardly. A rapid and effective chopping action is thus attained within the bowl. Other characteristic features of the device will become apparent from the subsequent description.

It is an object of the present invention, therefore, to disclose and provide a portable food chopper of high efficiency and relatively low cost.

Another object is to provide a device adapted for use by housewives in which efficient chopping action is obtained by the reciprocating action of two chopping knives, such knives moving simultaneously but out of phase.

A further object is to provide means whereby gravity feed of the choppers against food stuffs in a bowl is obtained.

Other objects, uses, advantages, modifications and adaptations of the present invention will become apparent to those skilled in the art from the following description of an exemplary form of the invention shown in the appended drawings and in which Fig. 1 is a side elevation of the device.

Fig. 3 is a horizontal section taken along the plane III—III of Fig. 1.

Fig. 4 is an end view of the head.

Fig. 5 is a side elevation of a vane for use in the device.

Figure 1:
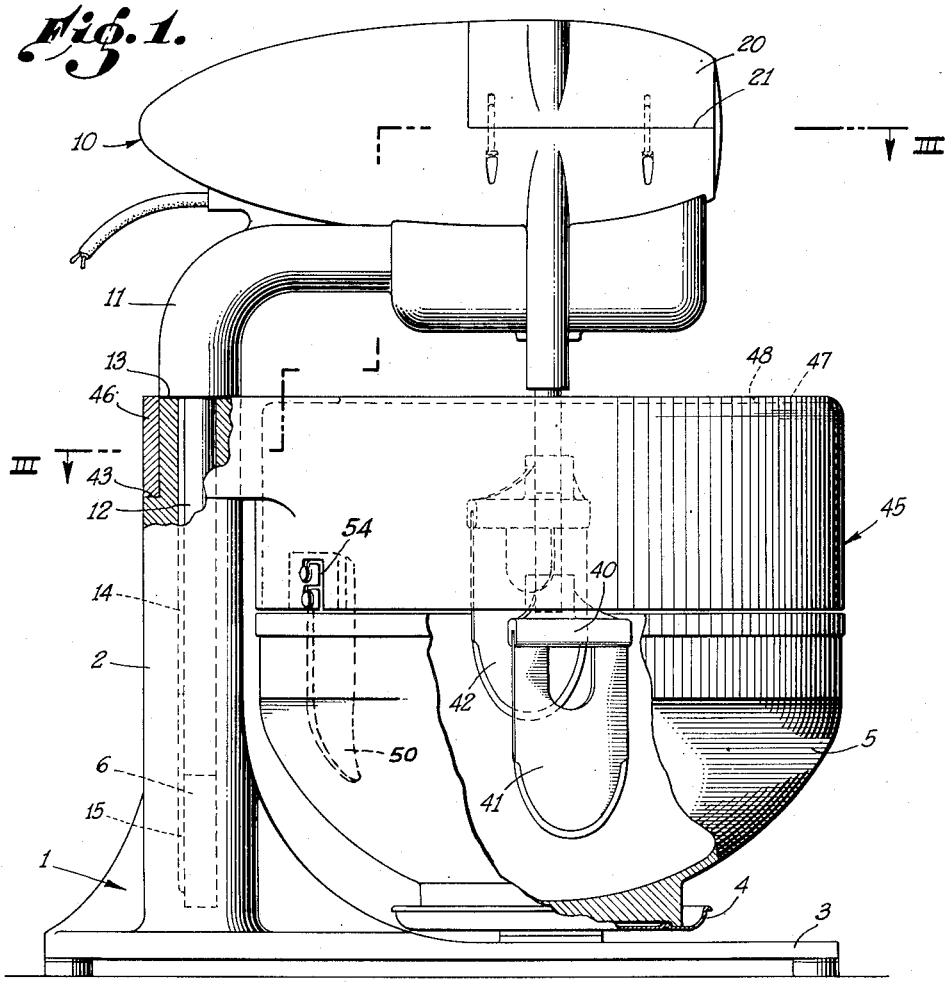
Figure 2:
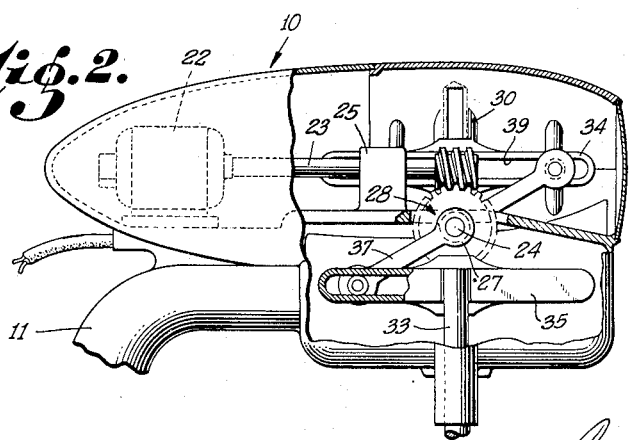
Fig. 2 is an enlarged side view of the upper housing, portions being broken away.

By referring to the drawings, it will be seen that the device comprises a base 1 having an upstanding boss 2, the boss being provided with a forward extension 3 which may, if desired, carry a rotatable table 4 adapted to support a suitable bowl 5. The vertical boss 2 is provided with a bore 6 which is open at the top and virtually closed at the bottom. A housing, generally indicated at 10, is carried by the upper end of an arm 11, said arm including a portion of reduced diameter 12 adapted to slidably fit into the bore 6. The shoulder 13 between the arm portion 11 and the arm 12 rests against the top of the boss 2.

Means are provided for preventing rotation of the arm 12 within the bore 6. Such means may include a key 14 carried by the upper portion of the arm 12, such key 14 slidably fitting a keyway 15 formed in the inner wall of the bore 6, the arm 12 and the housing 10 being thus maintained in proper position with respect to the bowl 5 when the device is in use.

The housing 10 extends over the extension 3 of the boss. The housing may be provided with a removable cover or portion indicated at 20, such removable cover or portion being attached to the main housing 10 along the joint 21. The housing 10 includes an electric motor 22 having a motor shaft or drive shaft 23. The housing also includes a transversely extending crank arm shaft 24. Bearings 25, 26 and 27 for the motor shaft 23 and the crank arm shaft 24 may be formed integrally with the housing 10.

Suitable gearing connects the drive shaft 23 with the crank arm shaft 24 such as, for example, the worm and wheel generally indicated at 28. Vertically extending bearings 30 and 31 are formed in the walls of the housing 10 and rods 32 and 33 having cross arms 34 and 35 respectively at their upper ends are slidably mounted in these bearings. Crank arms 36 and 37 are mounted on the crank arm shaft 24 and each of these crank arms is operably connected to one of the cross arms. For example, the crank arm 36 is provided with a roller or pin 38 cooperating with the slot or groove 39 formed in the cross arm 34. The crank arms and cross arms translate the rotary motion of the drive shaft 23 into reciprocating motion of the rods 32 and 33. It is to be understood that other means of translating rotary motion into reciprocating motion may be used but the arrangement specifically shown has been found to be both simple and effective.

Each of the lower arms of the vertically reciprocating parallel rods 32 and 33 is provided with a knife blade. For example, the lower end of rod 33 may carry a blade support 40 from which a blade 41 extends, the lower edge of the blade being arcuate and adapted to conform, in part at least, to the contour of the bowl 5. The rod 32 carries the knife blade 42 and it will be noted that the knife blades 41 and 42 are parallel but in spaced relation. It is also to be noted that the crank arms 36 and 37 are opposed on the crank arm shaft 42 so that the two knives 41 and 42 are caused to move simultaneously but in out of phase or in opposite directions.

It is also to be noted that the angle of the knife blades 41 and 42 with respect to the longitudinal axis of the housing 10 determines the spacing between the knife blades 41 and 42. In the drawings, the knife blades 41 and 42 are shown at an appreciable angle to the axis of the housing and for this reason the two individual blades will operate in planes spaced but a short distance apart. Furthermore, although the knife blades 41 and 42 are shown as made of plane sheets of material, those skilled in the art will readily appreciate that such knife blades may be curved when desired.

The worm and wheel drive 28 is in effect a reduction gearing but the chopping action of the blades 41 and 42 is rapid and it may be desirable to provide a splash guard or shield over the bowl 5.

As shown in the drawings, the upper end of the boss 2 is reduced in diameter so as to form a shoulder 43. A splash guard 45 of a diameter closely approximating that of the rim of the bowl 5 and provided with a lug 46 having a bore therein may be slipped over the upper end of the boss 2 so as to rest upon the shoulder 43. The guard or shield 45 is a hollow cylinder which may have an annular, inwardly extending flange 47, the opening delineated by the edge 48 being sufficient to permit the knives 41 and 42 to pass therethrough.

An attractive form of device is obtained by making the bowl 5 out of molded laminated wood and plastic whereas the splash guard or shield 45 is made of a substantially transparent or translucent plastic material.

In assembling and using the device, the bowl 5 may be placed upon the forward extension 3, the guard 45 then slipped onto the upper end of the boss 2 and then the head 10 is placed in position by inserting the arm 12 into the bore 6 of the boss 2 and fitting the key 14 into the keyway 15. The motor can then be started and it will be found that the entire housing 10 as well as the cutting knives will slowly descend into operative engagement with the food stuff in the bowl 5. It is to be noted that the arm 12 is substantially solid and acts as a piston within the bore 6 whereby the arm and housing may slowly descend by gravity while being checked by air contained in the bore 6, this air slowly leaking out either around the arm or through a minute aperture in the bottom of the bore. Additional food stuff may be placed into the bowl through the opening 48 in the top of the guard 45. When it is desired to remove the bowl, the housing 10 and the arm 11 may only be partially withdrawn from the bore 6 and when the lower end of key 14 reaches the level of the top of the boss 2, the entire housing as well as the guard 45 may be swung to one side, thereby permitting ready removal of the bowl 5.

When the turn-table 4 is used, such turn-table may be turned while the chopper is in action, thereby facilitating a more uniform chopping of food stuff contained in said bowl. It is to be noted that the alternate reciprocation of the knives 41 and 42 results in a self-cleaning action which prevents food stuffs from clogging the space between the knives. The guard or splash bowl 45 may be provided with a downwardly extending vane or vanes at its lower edge, these vanes tending to scrape food stuffs from the sides of the bowl as it is rotated and thereby feeding the food stuffs to the chopping knives. A vane of the character stated is shown in Fig. 5 and comprises a body portion 50 having a partially rounded flange 51 and large headed pins 52 and 53 in vertical alignment. The splash bowl 45 may have a vertical slot 54 formed in the lower edge, said vertical slot having two parallel horizontally extending bayonet slots in communication therewith. The vertical slot 54 is adapted to receive the shanks of the pins 52 and 53, the bayonet slots holding the vane 50 in position on the inner surface of the splash guard 45, the vane 50 extending into the bowl 5 of the device.

Those skilled in the art will appreciate that numerous changes and modifications may be made in the device and all changes coming within the scope of the appended claims are embraced thereby.

I claim:

1. An automatic portable food chopper comprising a base provided with a vertical boss having a vertical bore therein, a forward extension on said base, a split housing having a removable portion, mounted upon a downwardly extending arm adapted to be slidable in said base; a motor, a longitudinal drive shaft, and a transverse crank arm shaft in said housing, bearings for said shafts formed integrally with said housing, vertically extending bearings carried by the removable portion of the housing, a reciprocable rod in each of said vertical bearings, a cross arm carried by the upper end of each of said rods within the housing, a pair of cranks mounted on the crank arm shaft, one of said cranks being operably engaged with each of said cross arms, and a knife having a downwardly directed edge carried by the lower end of each of said reciprocating rods.

2. An automatic portable food chopper comprising a base provided with a vertical boss having a vertical bore therein, a forward extension on said base, a housing mounted upon an arm adapted to be slidably received in said bore, a pair of vertically reciprocable parallel rods in said housing, said rods extending downwardly therefrom above the forward extension of said base, a knife carried by the lower end of each of said rods, motor means including a drive shaft carried in said housing, and means within said housing for translating rotation of said drive shaft into reciprocating motion of said vertical rods.

3. An automatic portable food chopper comprising a base provided with a vertical boss having a vertical bore therein, a forward extension on said base, a housing mounted upon an arm adapted to be slidably received in said bore, a pair of vertically reciprocable parallel rods in said housing, said rods extending downwardly therefrom above the forward extension of said base, a knife carried by the lower end of each of said rods, motor means including a drive shaft carried in said housing, means within said housing for translating rotation of said drive shaft into reciprocating motion of said vertical rods, and means carried by said arm for preventing rotation of said arm within said bore when the arm is in lower positions.

4. An automatic portable food chopper comprising a base provided with a vertical boss having a vertical bore therein, a forward extension on said base, a housing mounted upon an arm adapted to be slidably received in said bore, a pair of vertically reciprocable parallel rods in said housing, said rods extending downwardly therefrom above the forward extension of said base, a knife carried by the lower end of each of said rods, motor means including a drive shaft carried in said housing, means within said housing for translating rotation of said drive shaft into reciprocating motion of said vertical rods, said bore being virtually closed at the bottom, said arm acting as a piston within said bore whereby said arm and housing may slowly descend by gravity while checked by aid in said bore.

ELSIE MEYER.